US 007861065B2

(12) United States Patent
Heil et al.

(10) Patent No.: US 7,861,065 B2
(45) Date of Patent: Dec. 28, 2010

(54) PREFERENTIAL DISPATCHING OF COMPUTER PROGRAM INSTRUCTIONS

(75) Inventors: Timothy H. Heil, Rochester, MN (US);
Brian L. Koehler, Rochester, MN (US);
Eric O. Mejdrich, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 12/118,298

(22) Filed: May 9, 2008

(65) Prior Publication Data
US 2009/0282221 A1 Nov. 12, 2009

(51) Int. Cl.
G06F 9/38 (2006.01)
G06F 9/52 (2006.01)

(52) U.S. Cl. .................. 712/214; 712/216

(58) Field of Classification Search ............. 712/214, 712/216
See application file for complete search history.

(56) References Cited

U.S. PATENT DOCUMENTS

| | | | |
|---|---|---|---|
| 4,813,037 A * | 3/1989 | Debuysscher et al. ....... 370/392 |
| 5,761,516 A | 6/1998 | Rostoker et al. |
| 5,884,060 A * | 3/1999 | Vegesna et al. ............. 712/215 |
| 6,085,315 A * | 7/2000 | Fleck et al. ................. 712/241 |
| 6,145,072 A | 11/2000 | Shams et al. |
| 6,151,668 A | 11/2000 | Pechanek et al. |
| 6,567,895 B2 * | 5/2003 | Scales ........................ 711/140 |
| 6,668,308 B2 | 12/2003 | Barroso et al. |
| 6,725,317 B1 | 4/2004 | Bouchier et al. |
| 6,950,438 B1 | 9/2005 | Owen et al. |
| 7,162,560 B2 | 1/2007 | Taylor et al. |
| 7,394,288 B1 | 7/2008 | Agarwal |
| 7,398,374 B2 | 7/2008 | DeLano |
| 7,464,197 B2 | 12/2008 | Ganapathy et al. |
| 7,493,474 B1 | 2/2009 | Pechanek et al. |
| 7,500,060 B1 | 3/2009 | Anderson et al. |
| 7,502,378 B2 | 3/2009 | Lajolo et al. |
| 7,521,961 B1 | 4/2009 | Anderson et al. |
| 7,546,444 B1 | 6/2009 | Wolrich et al. |
| 7,568,064 B2 | 7/2009 | Reblewski et al. |
| 2002/0178337 A1 | 11/2002 | Wilson et al. |

(Continued)

OTHER PUBLICATIONS

U.S. Appl. No. 12/117,897, filed May 9, 2008, Hoover, et al.

(Continued)

Primary Examiner—Daniel Pan
(74) Attorney, Agent, or Firm—Biggers & Ohanian, LLP

(57) ABSTRACT

A computer processor that includes a plurality of execution pipelines, each execution pipeline including a configuration of one or more execution units of the processor, each execution pipeline characterized by an execution pipeline type, each execution pipeline type determined according to the types of computer program instructions executed in each execution pipeline; a plurality of hardware threads of execution, each hardware thread including computer program instructions characterized by instruction types, each hardware thread including sequences of instructions of a same instruction type, the sequences interspersed with instructions of other types; and an instruction dispatcher capable of dispatching instructions preferentially during a predefined preference period from a preferred hardware thread to a particular execution pipeline in dependence upon whether the preferred hardware thread presents a sequence of instructions, ready for execution from the preferred hardware thread, of a type for execution in the particular execution pipeline.

18 Claims, 9 Drawing Sheets

U.S. PATENT DOCUMENTS

| | | | |
|---|---|---|---|
| 2003/0065890 A1 | 4/2003 | Lyon | |
| 2004/0088487 A1 | 5/2004 | Barroso et al. | |
| 2004/0260906 A1 | 12/2004 | Landin et al. | |
| 2005/0166205 A1* | 7/2005 | Oskin et al. | 718/103 |
| 2005/0238035 A1 | 10/2005 | Riley | |
| 2006/0209846 A1 | 9/2006 | Clermidy et al. | |
| 2007/0055826 A1 | 3/2007 | Morton et al. | |
| 2007/0076739 A1 | 4/2007 | Manjeshwar et al. | |
| 2008/0134191 A1 | 6/2008 | Warrier et al. | |
| 2008/0186998 A1 | 8/2008 | Rijpkema | |
| 2009/0083263 A1 | 3/2009 | Felch et al. | |
| 2009/0282222 A1 | 11/2009 | Hoover et al. | |

OTHER PUBLICATIONS

U.S. Appl. No. 12/031,733, filed Feb. 15, 2008, Hoover, et al.
U.S. Appl. No. 12/108,846, filed Apr. 24, 2008, Kuesel, et al.
U.S. Appl. No. 12/108,770, filed Apr. 24, 2008, Mejdrich, et al.
U.S. Appl. No. 12/029,647, filed Feb. 12, 2008, Hoover, et al.
U.S. Appl. No. 12/118,017, filed May 9, 2008, Comparan, et al.
U.S. Appl. No. 12/118,059, filed May 9, 2008, Mejdrich, et al.
U.S. Appl. No. 12/117,875, filed May 9, 2008, Hoover, et al.
U.S. Appl. No. 12/121,222, filed May 15, 2008, Kriegel, et al.
U.S. Appl. No. 11/936,873, filed Nov. 8, 2007, Hoover, et al.
U.S. Appl. No. 12/135,364, filed Jun. 9, 2008, Hoover, et al.
U.S. Appl. No. 11/937,579, filed Nov. 9, 2007, Mejdrich, et al.
U.S. Appl. No. 12/102,033, filed Apr. 14, 2008, Heil, et al.
U.S. Appl. No. 12/118,272, filed May 9, 2008, Kuesel, et al.
U.S. Appl. No. 12/118,039, filed May 9, 2008, Hoover, et al.
U.S. Appl. No. 11/945,396, filed Nov. 27, 2007, Hoover, et al.
U.S. Appl. No. 12/015,975, filed Jan. 17, 2008, Comparan, et al.
U.S. Appl. No. 12/117,906, filed May 9, 2008, Hoover, et al.
U.S. Appl. No. 12/233,180, filed Sep. 18, 2008, Hoover, et al.
U.S. Appl. No. 12/113,286, filed May 1, 2008, Heil, et al.
U.S. Appl. No. 11/955,553, filed Dec. 13, 2007, Comparan, et al.
U.S. Appl. No. 12/031,738, filed Feb. 15, 2008, Hoover, et al.
U.S. Appl. No. 11/972,753, filed Jan. 11, 2008, Mejdrich, et al.
U.S. Appl. No. 12/060,559, filed Apr. 1, 2008, Comparan, et al.
U.S. Appl. No. 11/926,212, filed Oct. 29, 2007, Hoover, et al.
U.S. Appl. No. 12/118,298, filed May 9, 2008, Heil, et al.
U.S. Appl. No. 12/118,315, filed May 9, 2008, Mejdrich, et al.
U.S. Appl. No. 11/938,376, filed Nov. 12, 2007, Mejdrich, et al.
U.S. Appl. No. 12/121,168, filed May 15, 2008, Hoover, et al.
Office Action Dated Jul. 20, 2009 in U.S. Appl. No. 12/031,733.
Kuskin, et al.; The Stanford Flash Multiprocessor; Jun. 6, 1996; Stanford University.
Office Action Dated Jan. 29, 2010 in U.S. Appl. No. 11/945,396.
Final Office Action Dated Jan. 15, 2010 in U.S. Appl. No. 12/031,733.
David Taylor, et al. "System on Chip Packet Processor for an Experimental Network Service Platform". 2003.
Office Action Dated Mar. 30, 2010 in U.S. Appl. No. 11/926,212.
Final Office Action Dated May 19, 2010 in U.S. Appl. No. 11/945,396.
Intel, E8870 Chipset, Intel, Jun. 2002, pp. 1-10.
Office Action Dated Apr. 2, 2010 in U.S. Appl. No. 11/955,553.
Kumar, et al. "A Network on Chip Architecture and Design Methodology". Published 2002, pp. 1-8, ISBN 0-7695-1486-03/02 by IEEE.
Bolotin, et al. "The Power of Priority: NoC based Distributed Cache Coherency". Published May 21, 2007, pp. 117-126, ISBN 0-7695-2773-06/07 by IEEE.
Office Action Dated Mar. 24, 2010 in U.S. Appl. No. 12/031,733.
Virtanen, et al. "NoC Interface for a Protocol Processor". University of Turku, 2004.
Walter, et al., "BENoC: A Bus-Enhanced Network on-Chip". Dec. 2007, Technion, Israel Institute of Technology, Haifa, Israel.
Office Action Dated Jun. 8, 2010 in U.S. Appl. No. 12/118,298.
Office Action Dated May 26, 2010 in U.S. Appl. No. 12/117,875.

* cited by examiner

PREFERENTIAL DISPATCHING OF COMPUTER PROGRAM INSTRUCTIONS

BACKGROUND OF THE INVENTION

1. Field of the Invention

The field of the invention is computer science, or, more specifically computer processors and methods of computer processor operation.

2. Description of Related Art

There are two widely used paradigms of data processing: multiple instructions, multiple data ('MIMD') and single instruction, multiple data ('SIMD'). In MIMD processing, a computer program is typically characterized as one or more threads of execution operating more or less independently, each requiring fast random access to large quantities of shared memory. MIMD is a data processing paradigm optimized for the particular classes of programs that fit it, including, for example, word processors, spreadsheets, database managers, many forms of telecommunications such as browsers, for example, and so on.

SIMD is characterized by a single program running simultaneously in parallel on many processors, each instance of the program operating in the same way but on separate items of data. SIMD is a data processing paradigm that is optimized for the particular classes of applications that fit it, including, for example, many forms of digital signal processing, vector processing, and so on.

There is another class of applications, however, including many real-world simulation programs, for example, for which neither pure SIMD nor pure MIMD data processing is optimized. That class of applications includes applications that benefit from parallel processing and also require fast random access to shared memory. For that class of programs, a pure MIMD system will not provide a high degree of parallelism and a pure SIMD system will not provide fast random access to main memory stores.

Many modern processor cores are optimized for use in fine-grain, multi-threading with multiple threads of execution implemented in hardware, with each such thread having its own dedicated set of architectural registers in the processor core. At least some such processor cores are capable of dispatching instructions from multiple hardware threads onto multiple execution engines simultaneously in multiple execution pipelines. Instruction synchronization across such hardware threads of execution occurs when two or more threads present sequences of a same instruction type at the same time, so that execution pipelines and execution units of other types are underutilized, and the efficiency of utilization of execution resources is substantially reduced.

SUMMARY OF THE INVENTION

A computer processor and methods of operating the computer processor where the computer processor includes a plurality of execution pipelines, each execution pipeline including a configuration of one or more execution units of the processor, each execution pipeline characterized by an execution pipeline type, each execution pipeline type determined according to the types of computer program instructions executed in each execution pipeline; a plurality of hardware threads of execution, each hardware thread comprising computer program instructions characterized by instruction types, each hardware thread including sequences of instructions of a same instruction type, the sequences interspersed with instructions of other types; and an instruction dispatcher capable of dispatching instructions preferentially during a predefined preference period from a preferred hardware thread to a particular execution pipeline in dependence upon whether the preferred hardware thread presents a sequence of instructions, ready for execution from the preferred hardware thread, of a type for execution in the particular execution pipeline.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
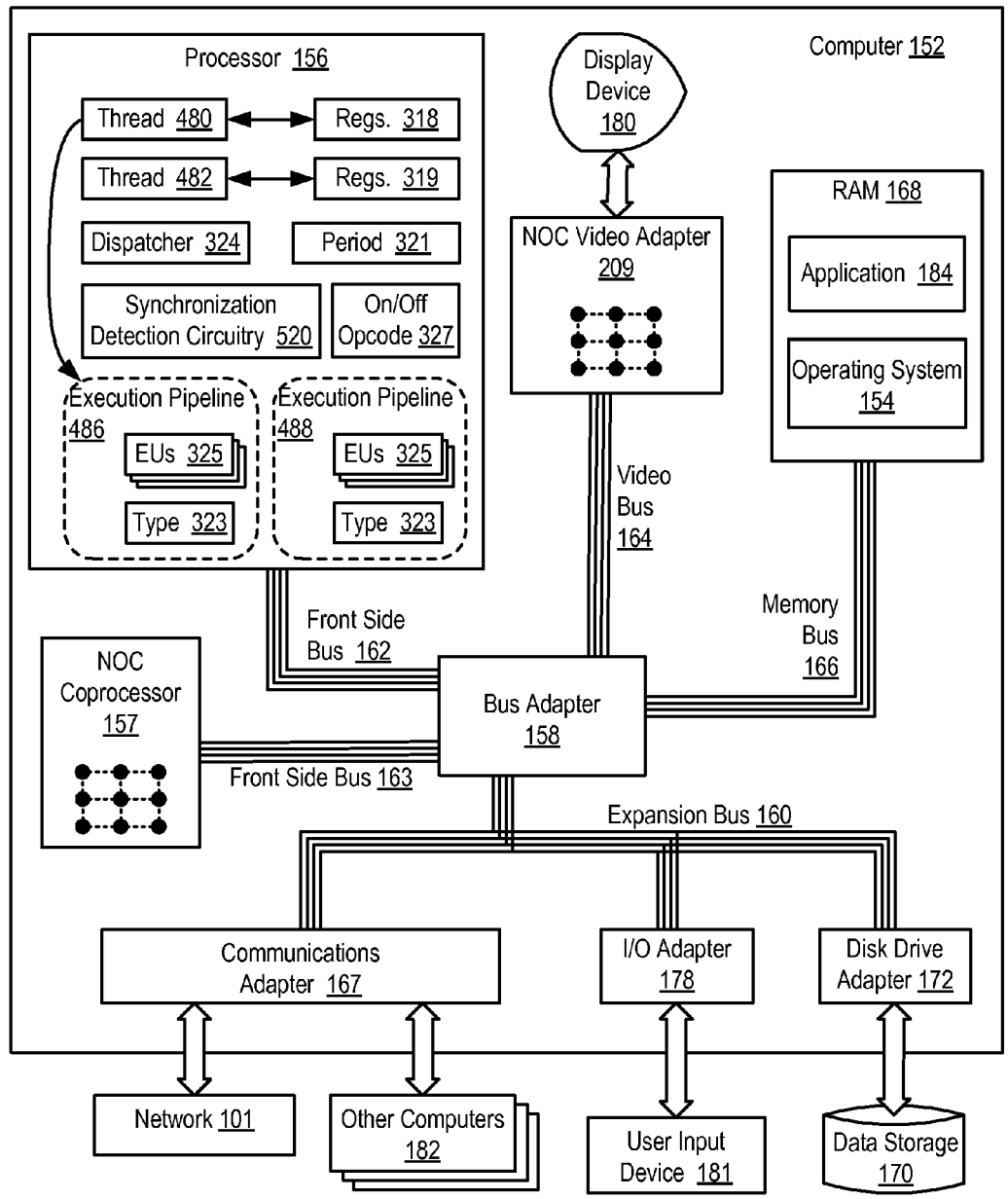
FIG. 1 sets forth a block diagram of automated computing machinery comprising an example of a computer useful with computer processors and computer processor operations according to embodiments of the present invention.

Examples of apparatus and methods for computer processors and computer processor operations in accordance with the present invention are described with reference to the accompanying drawings, beginning with FIG. 1. FIG. 1 sets forth a block diagram of automated computing machinery comprising an example of a computer (152) useful with computer processors and computer processor operations according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The computer processor (156) in the example of FIG. 1 includes a plurality of execution pipelines (486, 488). Each execution pipeline is made up of a configuration of one or more execution units (325) of the processor. Each execution pipeline is characterized by an execution pipeline type (323), where each execution pipeline type is determined according to the types of computer program instructions executed in each execution pipeline. Instructions may be typed, for example, according to the instructions' operation codes or 'opcodes,' ADD, STORE, LOAD, and so on. Instruction may be typed according to the execution unit upon which the instruction executes, so that Boolean and integer arithmetic operations would be of a type because they all execute on an ALU. In such a typing, all floating point operations would be of a type because they all execute on a floating point execution unit. And so on.

The computer processor (156) in the example of FIG. 1 includes a plurality of hardware threads of execution (480, 482), where each hardware thread includes computer program instructions characterized by instruction types. The threads are hardware threads in that the support for the threads is built into the processor itself in the form of a separate architectural register set (318, 319) for each thread (480, 482), so that each thread can execute simultaneously with no need for context switches among the threads. Each such hardware thread can run multiple software threads of execution implemented with the software threads assigned to portions of processor time called 'quanta' or 'time slots' and context switches that save the contents of a set of architectural registers for a software thread during periods when that software thread loses possession of its assigned hardware thread.

Each thread (480, 482) in the example of FIG. 1 includes a plurality of computer program instructions. Each such computer program instruction is composed of an operation code or 'opcode' and one or more instruction parameters that advise the processor how to execute the opcode, where to obtain the input data for execution of an opcode, where to place the results of execution of an opcode, and so on. Depending on the context, the terms "computer program instruction," "program instruction," and "instruction" are used generally throughout this specification as synonyms. The terms "thread of execution" and "thread" are similarly used as synonyms in this specification. Moreover, unless the context specifically says otherwise, the terms "thread of execution" and "thread" in this specification always refer to pipelined hardware threads.

Each hardware thread (480, 482) in the example of FIG. 1 includes sequences of instructions of a same instruction type, the sequences interspersed with instructions of other types. Table 1 sets forth an example of a thread with sequences of instructions of a same instruction type interspersed with instructions of other types.

TABLE 1

Example Instruction Sequences

| Thread ID | Instr. ID | Opcode | Parms |
|---|---|---|---|
| 480 | 0 | ADD | 010010001 |
| 480 | 1 | ADD | 010010001 |
| 480 | 2 | ADD | 001010000 |
| 480 | 3 | ADD | 100110001 |
| 480 | 4 | LOAD | 010010000 |
| 480 | 5 | STORE | 001011001 |
| 480 | 6 | ADD | 010010100 |
| 480 | 7 | ADD | 001010010 |
| 480 | 8 | ADD | 001010001 |
| 480 | 9 | ADD | 001010000 |

Each row of Table 1 represents an instruction in hardware thread (480). Each row includes a thread identifier ('Thread ID'), an instruction identifier (Instr. ID), an opcode for an instruction, and operation parameters for the instruction ('Parms'). In the example of Table 1, thread (480) is illustrated with two sequences of instructions of a same instruction type, ADD instructions, interspersed with instructions of other types, a LOAD and a STORE instruction.

The computer processor (156) in the example of FIG. 1 includes an instruction dispatcher (324) capable of dispatching instructions preferentially during a predefined preference period (321) from a preferred hardware thread (480) to a particular execution pipeline (486) in dependence upon whether the preferred hardware thread presents a sequence of instructions, ready for execution from the preferred hardware thread, of a type for execution in the particular execution pipeline. Such dispatching of instructions preferentially from a preferred hardware thread improves the efficiency of execution unit utilization in a processor by reducing instruction synchronization among hardware threads. Instruction synchronization occurs when two or more threads present sequences of a same instruction type at the same time—so that execution pipelines and execution units of other types are underutilized. For further explanation of instruction synchronization, consider the example of Table 2.

TABLE 2

Example Instruction Synchronization

| Instr. ID | Thread 480 | Thread 482 |
|---|---|---|
| 0 | ADD | STORE |
| 1 | ADD | LOAD |
| 2 | ADD | FPADD |
| 3 | ADD | ADD |
| 4 | ADD | ADD |
| 5 | ADD | ADD |
| 6 | STORE | LOAD |
| 7 | LOAD | FPSUB |
| 8 | ADD | STORE |
| 9 | ADD | ADD |

Table 2 illustrates instruction synchronization among two threads (480, 482) executing on a processor having, for ease of explanation, one ALU in an ALU execution pipeline, one STORE execution pipeline with a single STORE execution unit, one LOAD execution pipeline with one LOAD execution unit, and one floating point execution pipeline with only one floating point execution unit. Instructions from the threads are dispatched round robin from each thread in turn to the appropriate execution pipeline and appropriate execution unit according to instruction type—and generally in the sequence indicated by the instruction identifiers, 0, 1, 2, and so on. The threads contain sequences of instructions of a same type, ADD instructions, interspersed with instructions of other types. Synchronization obtains when both threads present ADD instructions for dispatch at the same time.

If the instruction dispatcher could dispatch only one instruction from each thread per clock cycle, then, if begun with instructions 0, the instruction dispatcher would reach synchronization at instructions 3, when both threads present ADD instructions at the same time. Such hardware threads, however, tend to speed toward synchronization more rapidly than that particular sequence would suggest. In this example, with four separate execution pipelines and four separate execution units, the instruction dispatcher can dispatch ADD instruction 0 from thread (480) and instructions 0, 1, and 2 from thread (482) all at the same time, on the same clock cycle. If all those instructions execute in one clock cycle, then the threads are synchronized by the second clock cycle, because they both will present ADD instructions on the second clock cycle, thread (480) presenting its instruction 1 and thread (482) presenting its instruction 3. So, instead of taking three clock cycles to synchronize, these threads bearing these particular combinations of instructions synchronize in only one clock cycle. This example was chosen for ease of explanation, but the fact of rapid advance toward synchronization among instructions in such threads is generally true.

The problem is what happens when synchronization is encountered. That is, such synchronization is very harmful to the efficient utilization of execution resources. Note that on the first clock cycle, execution pipeline efficiency and utilization of execution units are excellent. All execution pipelines and all execution unit are fully utilized, an ADD instruction in the ALU, a STORE instruction in the STORE execution pipeline, a LOAD instruction in the LOAD execution pipeline, and a floating point ADD ('FPADD') instruction in the floating point execution unit. On the second clock cycle, however, in the presence of instruction synchronization across the threads, only one of the four execution pipelines is utilized, one ADD instruction only is executed. Two ADDs are presented for dispatch on the second clock cycle, instruction 1 from thread (480) and instruction 3 from thread (482). But there is only one ALU, so only one ADD instruction can be dispatched for execution on the second clock cycle. The arrival of instruction synchronization in this example instantly and drastically reduced efficiency of utilization of execution resources in the processor from 100% to 25%. Again, this example is chosen for clarity of explanation, but instruction synchronization among such threads of execution generally presents harmful reductions in the efficiency of utilization of execution resources in such computer processors.

Dispatching instructions preferentially according to embodiments of the present invention reduces the harmful effect of instruction synchronization. Note that in the example of Table 2, after the instructions in the threads are synchronized, traditional round robin dispatching requires six clock cycles to remove the synchronization, dispatching the following six ADD instruction one a time because there is only one ADD execution pipeline:

instruction 1 from thread (480)
instruction 3 from thread (482)
instruction 2 from thread (480)
instruction 4 from thread (482)
instruction 3 from thread (480)
instruction 5 from thread (482)

Dispatching instructions preferentially with thread (482) taken as the preferred thread, however, clears the synchronization in only three clock cycles, dispatching:

instruction 3 from thread (482)
instruction 4 from thread (482)
instruction 5 from thread (482)

Now on the next clock cycle, with no present instruction synchronization, the instruction dispatcher can dispatch instruction 1 from thread (480) and instructions 6, 7, and 8 from thread (482), moving the efficiency of execution resource utilization back from 25% to 100%. Again, this example is chosen for ease of explanation, but dispatching instructions preferentially according to embodiments of the present invention generally improves efficiency of execution resource utilization in such computer processors.

The instruction dispatcher (324) in the example of FIG. 1 dispatches instructions preferentially during a predefined preference period (321) from a preferred hardware thread (480) to a particular execution pipeline (486) in dependence upon whether the preferred hardware thread presents a sequence of instructions, ready for execution from the preferred hardware thread, of a type for execution in the particular execution pipeline. In the example of Table 2, the predefined preference period is so long as the preferred thread continues to present a sequence of instructions of a type for execution in a particular execution pipeline, in this case, instructions of a type for execution in an ALU pipeline, that is, ADD instructions. In this example, where the preference period is defined by the nature of the instruction sequence, the preference period is only three clock cycles. Readers will recognize, however, that sequences of instructions of the same type can be much longer, so that in some embodiments at least, defining a preference period by length of a sequence can risk starving other threads of execution resources. Accordingly, therefore, there are other ways of predefining preference periods within the scope of the present invention, including, for example, predefining the preference period as a predetermined number of instructions of the same type and predefining the preference period as a predetermined number of clock cycles. No doubt other ways of predefining a preference period will occur to those of skill in the art, and all such ways are well within the scope of the present invention.

For further explanation, distinguish traditional round robin dispatching from preferential dispatching according to embodiments of the present invention. In traditional round robin dispatching, when an execution pipeline or execution unit of a particular type is available to accept a dispatched instruction, the instruction dispatcher steps through the threads looking for an instruction that matches the type. If an instruction of a type is not available from a thread, the instruction dispatcher steps to the next thread, and so on, until the dispatcher finds an instruction of the type to dispatch. When the dispatcher finds an instruction of the type, the dispatcher dispatches the instruction and then steps to a next thread to look for a next instruction of that type.

In contrast, in preferential dispatching according to embodiments of the present invention, when the dispatcher finds a thread with an instruction of the type, the dispatcher typically continues to dispatch from the same thread, without moving on to a next thread, if the same thread continues to present instructions of the same type ready for dispatch. In embodiments where the general approach to dispatching is round robin, the effect of preferential dispatching according to embodiments of the present invention is to produce a kind of slow spot in the round robin, a 'slow round robin,' as it were. A predefined preference period may be set in various ways to reduce the risk of starving other threads with the slow spot in a preferred thread. Readers will recognize that the purpose of preferential dispatching is to reduce synchronization by preferring or weighting access to execution resources in favor of a preferred thread, not by assigning an absolute priority that risks starving other threads. It is useful to note that any practical preference, even small ones, will tend to clear synchronization. Even a preference period lasting only a few clock cycles, for example, is useful to clear synchronization. In order to employ preferential dispatching to reduce synchronization and its attendant inefficiencies in utilization of execution resources, therefore, there is no need to risk starving other threads in favor of a preferred thread.

In some embodiments at least, particularly those that use a scheme similar to round robin to step through the threads, it is desirable to avoid the slow spot occasioned by preferential dispatching by providing the ability to turn on preferential dispatching when it is needed to clear synchronization and turn off preferential dispatching when it is not needed. One way to do this is to provide an ability to turn dispatching instructions preferentially on and off in software, provided in this case by an opcode (327) of the processor (156) specifically dedicated to turning preferential dispatching on and off under software control. Such an opcode can be supported in assemblers and also through compilers in higher level languages to give programmers express control of preferential dispatching. In this way, a programmer who knows that a section of code in a programming language, any programming language, will generate many instruction of the same type can expressly turn on preferential dispatching and then turn it off again for segments of code where preferential dispatching is not needed because it is clear that there is little risk of generating many instructions of the same type. Similarly, a compiler can be programmed to detect sequences of instructions of the same type and insert an assembler instruction or opcode to turn on preferential dispatching when it is needed and turn it off when not needed.

In addition to supporting an opcode (327) that gives programmers, assemblers, and compilers the ability to turn preferential dispatching on and off in software, the processor (156) in the example of FIG. 1 also includes synchronization detection circuitry (520) that examines instructions in the threads of execution (480, 482) and detects synchronization in instructions of a same type among two or more hardware threads, giving the processor the ability itself to turn preferential dispatching on and off without regard to software controls. In the example of FIG. 1, when the synchronization circuitry (520) detects the presence of synchronization among program instructions in two or more threads of execution, the instruction dispatcher (324) can turn on preferential dispatching by designating as the preferred hardware thread a hardware thread in which such synchronization is detected and dispatching instructions preferentially from such a designated preferred hardware thread. When the synchronization circuitry (520) reports that the synchronization has been cleared, the instruction dispatcher (324) can turn off preferential dispatching under its own hardware control. In addition in the example processor (156) of FIG. 1, the instruction dispatcher (324) is further capable of rotating among the hardware threads of execution (480, 482) the designation of the preferred hardware thread from which instructions are to be preferentially dispatched. For ease of explanation, the processor (156) in the example of FIG. 1 is illustrated with only two hardware threads of execution (480, 482), but readers will recognize that processors that support preferential dispatching according to embodiments of the present invention may be implemented with any number of hardware threads as may occur to those of skill in the art.

The computer processor (156) in the example of FIG. 1 includes a plurality of pipelined hardware threads (446, 458) of execution. The threads are 'pipelined' (455, 457) in that the processor is configured with execution units (325) so that the processor can have under execution within the processor more than one instruction at the same time. The threads are hardware threads in that the support for the threads is built into the processor itself in the form of a separate architectural register set (318, 319) for each thread (480, 482), so that each thread can execute simultaneously with no need for context switches among the threads. Each such hardware thread can run multiple software threads of execution implemented with the software threads assigned to portions of processor time called 'quanta' or 'time slots' and context switches that save the contents of a set of architectural registers for a software thread during periods when that software thread loses possession of its assigned hardware thread.

Each thread (480, 482) in the example of FIG. 1 includes a plurality of computer program instructions. Each such computer program instruction is composed of an operation code or 'opcode' and one or more instruction parameters that advise the processor how to execute the opcode, where to obtain the input data for execution of an opcode, where to place the results of execution of an opcode, and so on. Depending on the context, the terms "computer program instruction," "program instruction," and "instruction" are used generally throughout this specification as synonyms. The terms "thread of execution" and "thread" are similarly used as synonyms in this specification. Moreover, unless the context specifically says otherwise, the terms "thread of execution" and "thread" in this specification always refer to pipelined hardware threads.

Stored in RAM (168) in the example computer of FIG. 1 is an application program (184), a module of user-level computer program instructions for carrying out particular data processing tasks such as, for example, word processing, spreadsheets, database operations, video gaming, stock market simulations, atomic quantum process simulations, or other user-level applications. Also stored in RAM (168) is an operating system (154). Operating systems useful with computer processors and computer processor operations according to embodiments of the present invention include UNIX™, Linux™, Microsoft XP™, AIX™, IBM's i5/OS™, and others as will occur to those of skill in the art. The operating system (154) and the application (184) in the example of FIG. 1 are shown in RAM (168), but many components of such software typically are stored in non-volatile memory also, such as, for example, on a disk drive (170).

The example computer (152) includes two examples of devise with networks on chips ('NOCs') having computer processors and computer processor operations according to embodiments of the present invention: a video adapter (209) and a coprocessor (157). The video adapter (209) is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus. The example NOC coprocessor (157) is connected to processor (156) through bus adapter (158), and front side buses (162, 163), which also are high speed buses. The NOC coprocessor of FIG. 1 is optimized to accelerate particular data processing tasks at the behest of the main processor (156).

The example NOC video adapter (209) and NOC coprocessor (157) of FIG. 1 each include a NOC with computer processors and computer processor operations according to embodiments of the present invention, each also including integrated processor ('IP') blocks, routers, memory communications controllers, and network interface controllers, each IP block adapted to a router through a memory communications controller and a network interface controller, each memory communications controller controlling communication between an IP block and memory, and each network interface controller controlling inter-IP block communications through routers. Each IP block in such NOC devices (209, 157) can include one or more computer processors according to embodiments of the present invention. More details of NOC structure and operation are discussed below.

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers with computer processors and computer processor operations according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful with computer processors and computer processor operations according to embodiments of the present invention include modems for wired dial-up communications, Ethernet (IEEE 802.3) adapters for wired data communications network communications, and 802.11 adapters for wireless data communications network communications.

Figure 2:
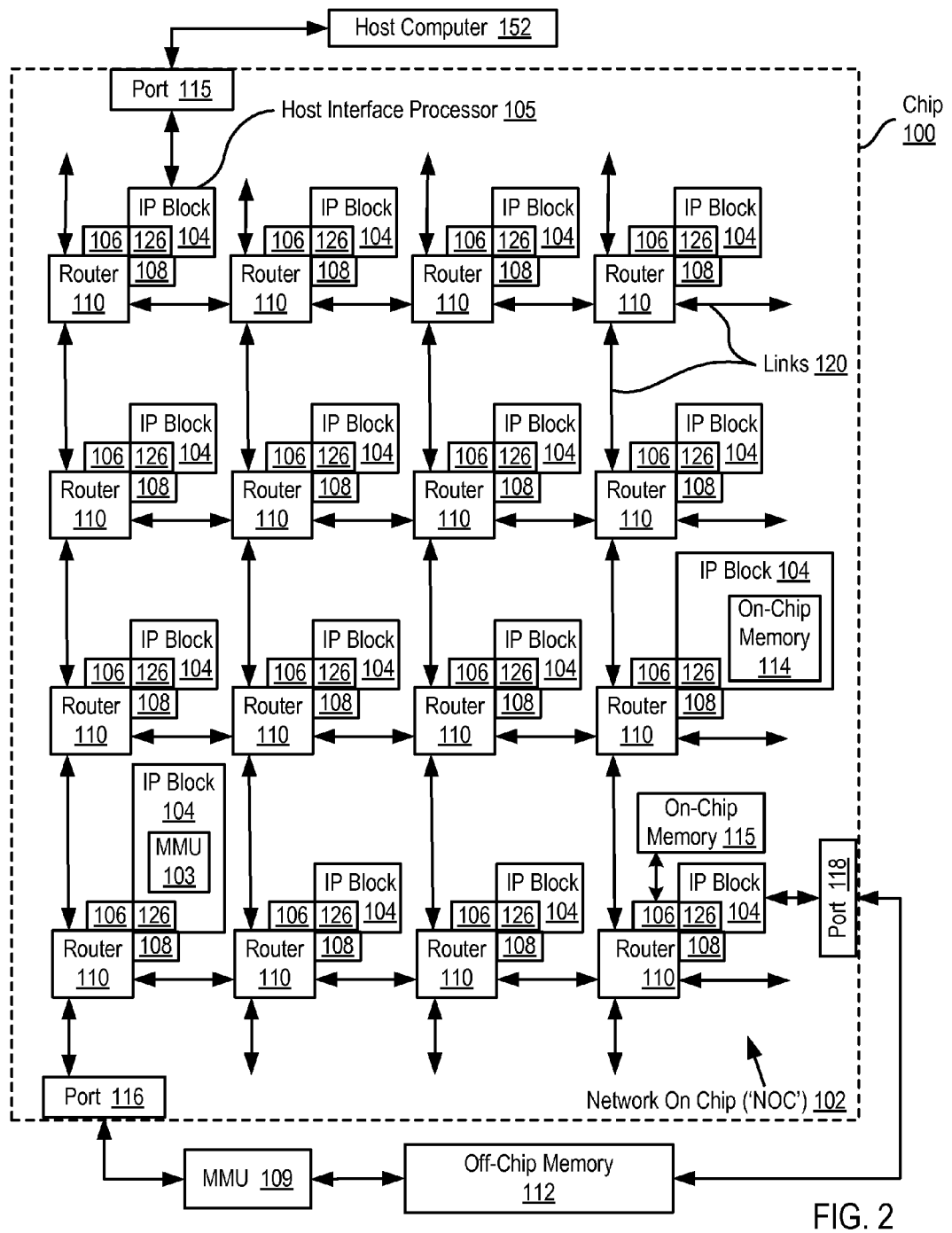
FIG. 2 sets forth a functional block diagram of an example NOC with computer processors and computer processor operations according to embodiments of the present invention.

For further explanation, FIG. 2 sets forth a functional block diagram of an example NOC (102) with computer processors and computer processor operations according to embodiments of the present invention. The NOC in the example of FIG. 2 is implemented on a 'chip' (100), that is, on an integrated circuit. The NOC (102) of FIG. 2 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110).

In the NOC (102) of FIG. 2, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs, for example.

One way to describe IP blocks by analogy is that IP blocks are for NOC design what a library is for computer programming or a discrete integrated circuit component is for printed circuit board design. In NOCs that are useful with processors and methods of processor operation according to embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well.

In the example of FIG. 2, each IP block (104) implements a general purpose microprocessor (126) that dispatches instructions preferentially according to embodiments of the present invention. Each such microprocessor (126) implements a plurality of execution pipelines, where each execution pipeline includes a configuration of one or more execution units of the processor. Each execution pipeline is characterized by an execution pipeline type, and each execution pipeline type is determined according to the types of computer program instructions executed in each execution pipeline. Each such microprocessor (126) also implements a plurality of hardware threads of execution. Each hardware thread includes computer program instructions characterized by instruction types, and each hardware thread includes sequences of instructions of a same instruction type with the sequences interspersed with instructions of other types. Each such microprocessor (126) includes an instruction dispatcher that dispatches instructions preferentially during a predefined preference period from a preferred hardware thread to a particular execution pipeline in dependence upon whether the preferred hardware thread presents a sequence of instructions, ready for execution from the preferred hardware thread, of a type for execution in the particular execution pipeline.

Each IP block (104) in the example of FIG. 2 is adapted to a router (110) through a memory communications controller (106). Each memory communication controller is an aggregation of synchronous and asynchronous logic circuitry adapted to provide data communications between an IP block and memory. Examples of such communications between IP blocks and memory include memory load instructions and memory store instructions. The memory communications controllers (106) are described in more detail below with reference to FIG. 3.

Each IP block (104) in the example of FIG. 2 is also adapted to a router (110) through a network interface controller (108). Each network interface controller (108) controls communications through routers (110) between IP blocks (104). Examples of communications between IP blocks include messages carrying data and instructions for processing the data among IP blocks in parallel applications and in pipelined applications. The network interface controllers (108) are described in more detail below with reference to FIG. 3.

Each IP block (104) in the example of FIG. 2 is adapted to a router (110). The routers (110) and links (120) among the routers implement the network operations of the NOC. The links (120) are packet structures implemented on physical, parallel wire buses connecting all the routers. That is, each link is implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wise, 512 wires. In addition, each link is bi-directional, so that if the link packet structure includes 64 bytes, the wire bus actually contains 1024 wires between each router and each of its neighbors in the network. A message can includes more than one packet, but each packet fits precisely onto the width of the wire bus. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller (106) in the example of FIG. 2 controls communications between an IP block and memory. Memory can include off-chip main RAM (112), memory (115) connected directly to an IP block through a memory communications controller (106), on-chip memory enabled as an IP block (114), and on-chip caches. In the NOC of FIG. 2, either of the on-chip memories (114, 115), for example, may be implemented as on-chip cache memory. All these forms of memory can be disposed in the same address space, physical addresses or virtual addresses, true even for the memory attached directly to an IP block. Memory-addressed messages therefore can be entirely bidirectional with respect to IP blocks, because such memory can be addressed directly from any IP block anywhere on the network. Memory (114) on an IP block can be addressed from that IP block or from any other IP block in the NOC. Memory (115) attached directly to a memory communication controller can be addressed by the IP block that is adapted to the network by that memory communication controller—and can also be addressed from any other IP block anywhere in the NOC.

The example NOC includes two memory management units ('MMUs') (103, 109), illustrating two alternative memory architectures for NOCs with computer processors and computer processor operations according to embodiments of the present invention. MMU (103) is implemented with an IP block, allowing a processor within the IP block to operate in virtual memory while allowing the entire remaining architecture of the NOC to operate in a physical memory address space. The MMU (109) is implemented off-chip, connected to the NOC through a data communications port (116). The port (116) includes the pins and other interconnections required to conduct signals between the NOC and the MMU, as well as sufficient intelligence to convert message packets from the NOC packet format to the bus format required by the external MMU (109). The external location of the MMU means that all processors in all IP blocks of the NOC can operate in virtual memory address space, with all conversions to physical addresses of the off-chip memory handled by the off-chip MMU (109).

In addition to the two memory architectures illustrated by use of the MMUs (103, 109), data communications port (118) illustrates a third memory architecture useful in NOCs with computer processors and computer processor operations according to embodiments of the present invention. Port (118) provides a direct connection between an IP block (104) of the NOC (102) and off-chip memory (112). With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port (118). The port (118) includes the pins and other interconnections required to conduct signals between the NOC and the off-chip memory (112), as well as sufficient intelligence to convert message packets from the NOC packet format to the bus format required by the off-chip memory (112).

In the example of FIG. 2, one of the IP blocks is designated a host interface processor (105). A host interface processor (105) provides an interface between the NOC and a host computer (152) in which the NOC may be installed and also provides data processing services to the other IP blocks on the NOC, including, for example, receiving and dispatching among the IP blocks of the NOC data processing requests from the host computer. A NOC may, for example, implement a video graphics adapter (209) or a coprocessor (157) on a larger computer (152) as described above with reference to FIG. 1. In the example of FIG. 2, the host interface processor (105) is connected to the larger host computer through a data communications port (115). The port (115) includes the pins and other interconnections required to conduct signals between the NOC and the host computer, as well as sufficient intelligence to convert message packets from the NOC to the bus format required by the host computer (152). In the example of the NOC coprocessor in the computer of FIG. 1, such a port would provide data communications format translation between the link structure of the NOC coprocessor (157) and the protocol required for the front side bus (163) between the NOC coprocessor (157) and the bus adapter (158).

Figure 3:
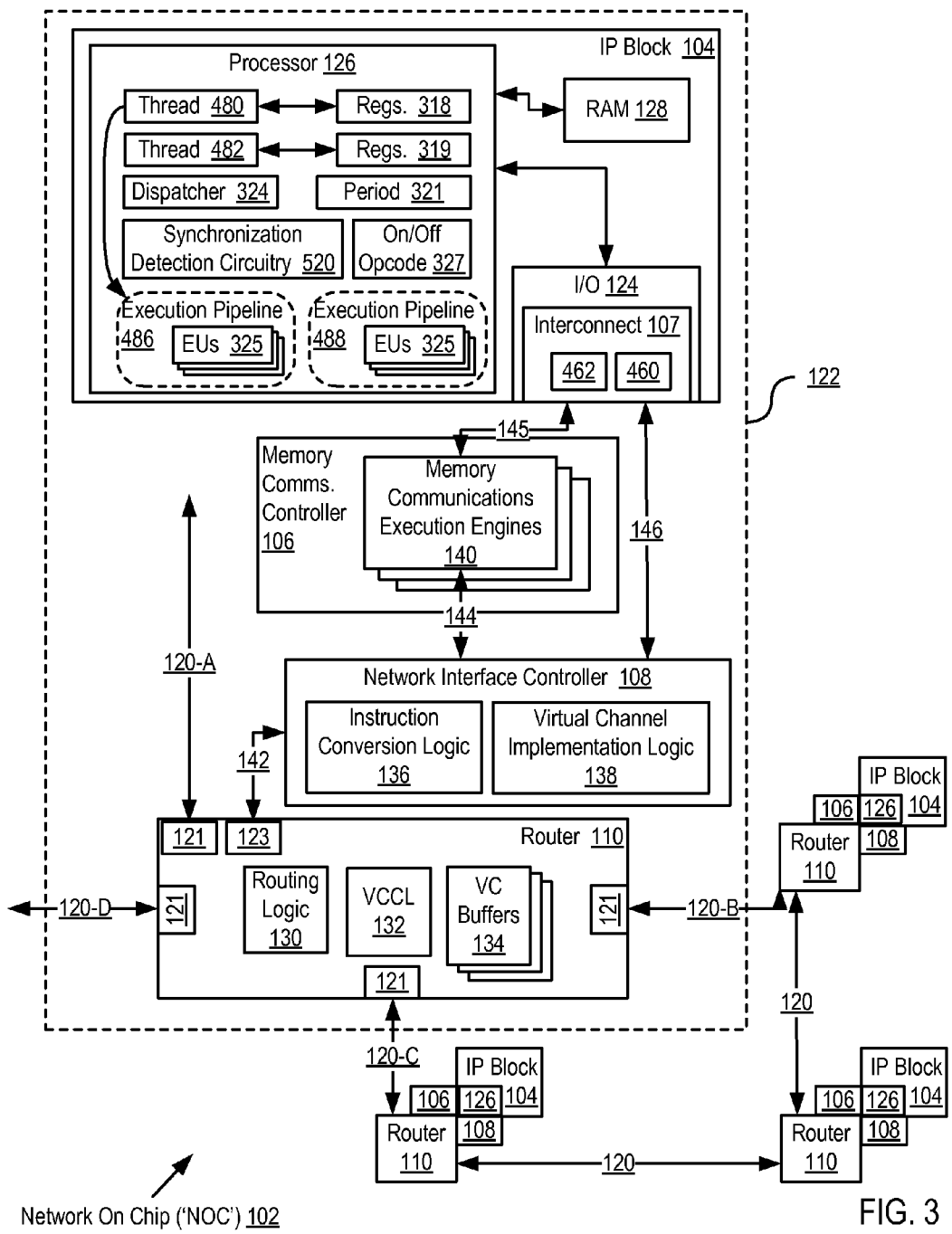
FIG. 3 sets forth a functional block diagram of a further example NOC with computer processors and computer processor operations according to embodiments of the present invention.

For further explanation, FIG. 3 sets forth a functional block diagram of a further example NOC with computer processors and computer processor operations according to embodiments of the present invention. The example NOC of FIG. 3 is similar to the example NOC of FIG. 2 in that the example NOC of FIG. 3 is implemented on a chip (100 on FIG. 2), and the NOC (102) of FIG. 3 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110). In the example of FIG. 3, one set (122) of an IP block (104) adapted to a router (110) through a memory communications controller (106) and network interface controller (108) is expanded to aid a more detailed explanation of their structure and operations. All the IP blocks, memory communications controllers, network interface controllers, and routers in the example of FIG. 3 are configured in the same manner as the expanded set (122).

In the example of FIG. 3, each IP block (104) includes a computer microprocessor (126) and I/O functionality (124). In this example, computer memory is represented by a segment of random access memory ('RAM') (128) in each IP block (104). The memory, as described above with reference to the example of FIG. 2, can occupy segments of a physical address space whose contents on each IP block are addressable and accessible from any IP block in the NOC. The microprocessors (126), I/O capabilities (124), and memory (128) on each IP block effectively implement the IP blocks as generally programmable microcomputers. In the example of FIG. 3, each IP block includes a low latency, high bandwidth application messaging interconnect (107) that adapts the IP block to the network for purposes of data communications among IP blocks. Each such messaging interconnect includes an inbox (460) and an outbox (462).

In the example of FIG. 3, each IP block (104) implements a general purpose microprocessor (126) that dispatches instructions preferentially according to embodiments of the present invention. Each microprocessor (126) in the example of FIG. 3 includes a plurality of execution pipelines (486, 488). Each execution pipeline is made up of a configuration of one or more execution units (325) of the microprocessor. Each execution pipeline is characterized by an execution pipeline type, where each execution pipeline type is determined according to the types of computer program instructions executed in each execution pipeline. Instructions may be typed, for example, according to the instructions' operation codes or 'opcodes,' ADD, STORE, LOAD, and so on. Instruction may be typed according to the execution unit upon which the instruction executes, so that Boolean and integer arithmetic operations would be of a type because they all execute on an ALU. In such a typing, all floating point operations would be of a type because they all execute on a floating point execution unit. And so on.

Each microprocessor (126) in the example of FIG. 3 includes a plurality of hardware threads of execution (480, 482), where each hardware thread includes computer program instructions characterized by instruction types. The threads are hardware threads in that the support for the threads is built into the microprocessor itself in the form of a separate architectural register set (318, 319) for each thread (480, 482), so that each thread can execute simultaneously with no need for context switches among the threads. Each such hardware thread can run multiple software threads of execution implemented with the software threads assigned to portions of processing time called 'quanta' or 'time slots' and context switches that save the contents of a set of architectural registers for a software thread during periods when that software thread loses possession of its assigned hardware thread. Each hardware thread (480, 482) in the example of FIG. 3 includes sequences of instructions of a same instruction type, the sequences interspersed with instructions of other types as described above with reference to Table 1.

Each microprocessor (126) in the example of FIG. 3 includes an instruction dispatcher (324), a network of static and dynamic logic within the microprocessor (126) that dispatches, for purposes of pipelining program instructions internally within the microprocessor, instructions from hardware threads to execution pipelines (486, 488) and hence to execution units (325). Each instruction dispatcher in this example dispatches instructions preferentially during a predefined preference period (321) from a preferred hardware thread (480) to a particular execution pipeline (486) in dependence upon whether the preferred hardware thread presents a sequence of instructions, ready for execution from the preferred hardware thread, of a type for execution in the particular execution pipeline. The predefined preference period may be so long as the preferred thread continues to present a sequence of instructions of a type for execution in a particular execution pipeline, although there are other ways of predefining preference periods within the scope of the present invention, including, for example, predefining the preference period as a predetermined number of instructions of the same type and predefining the preference period as a predetermined number of clock cycles.

Each microprocessor in this example provides an ability to turn dispatching instructions preferentially on and off in software by an opcode (327) of the microprocessor (126) specifically dedicated to turning preferential dispatching on and off under software control. Such an opcode can be supported in assemblers and also through compilers in higher level languages to give programmers express control of preferential dispatching.

In addition to supporting an opcode (327) that gives programmers, assemblers, and compilers the ability to turn preferential dispatching on and off in software, the microprocessor (126) in the example of FIG. 3 also includes synchronization detection circuitry (520) that examines instructions in the threads of execution (480, 482) and detects synchronization in instructions of a same type among two or more hardware threads, giving the microprocessor the ability itself to turn preferential dispatching on and off without regard to software controls. In the example of FIG. 3, when the synchronization circuitry (520) detects the presence of synchronization among program instructions in two or more threads of execution, the instruction dispatcher (324) can turn on preferential dispatching by designating as the preferred hardware thread a hardware thread in which such synchronization is detected and dispatching instructions preferentially from such a designated preferred hardware thread. When the synchronization circuitry (520) reports that the synchronization has been cleared, the instruction dispatcher (324) can turn off preferential dispatching under its own hardware control. In addition in the example microprocessor (126) of FIG. 3, the instruction dispatcher (324) is further capable of rotating among the hardware threads of execution (480, 482) the designation of the preferred hardware thread from which instructions are to be preferentially dispatched.

In the NOC (102) of FIG. 3, each memory communications controller (106) includes a plurality of memory communications execution engines (140). Each memory communications execution engine (140) is enabled to execute memory communications instructions from an IP block (104), including bidirectional memory communications instruction flow (142, 144, 145) between the network and the IP block (104). The memory communications instructions executed by the memory communications controller may originate, not only from the IP block adapted to a router through a particular memory communications controller, but also from any IP block (104) anywhere in the NOC (102). That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine (140) is enabled to execute a complete memory communications instruction separately and in parallel with other memory communications execution engines. The memory communications execution engines implement a scalable memory transaction processor optimized for concurrent throughput of memory communications instructions. The memory communications controller (106) supports multiple memory communications execution engines (140) all of which run concurrently for simultaneous execution of multiple memory communications instructions. A new memory communications instruction is allocated by the memory communications controller (106) to a memory communications engine (140) and the memory communications execution engines (140) can accept multiple response events simultaneously. In this example, all of the memory communications execution engines (140) are identical. Scaling the number of memory communications instructions that can be handled simultaneously by a memory communications controller (106), therefore, is implemented by scaling the number of memory communications execution engines (140).

In the NOC (102) of FIG. 3, each network interface controller (108) is enabled to convert communications instructions from command format to network packet format for transmission among the IP blocks (104) through routers (110). The communications instructions are formulated in command format by the IP block (104) or by the memory communications controller (106) and provided to the network interface controller (108) in command format. The command format is a native format that conforms to architectural register files of the IP block (104) and the memory communications controller (106). The network packet format is the format required for transmission through routers (110) of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In the NOC (102) of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. All memory-address-based communication that are executed with message traffic are passed from the memory communications controller to an associated network interface controller for conversion (136) from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller (106) is naturally also the network location of that memory communication controller's associated router (110), network interface controller (108), and IP block (104). The instruction conversion logic (136) within each network interface controller is capable of converting memory addresses to network addresses for purposes of transmitting memory-address-based communications through routers of a NOC.

Upon receiving message traffic from routers (110) of the network, each network interface controller (108) inspects each packet for memory instructions. Each packet containing a memory instruction is handed to the memory communications controller (106) associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In the NOC (102) of FIG. 3, each IP block (104) is enabled to bypass its memory communications controller (106) and send inter-IP block, network-addressed communications (146) directly to the network through the IP block's network interface controller (108). Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through it I/O functions (124) directly to the IP block's network interface controller in command format, then converted to packet format by the network interface controller and transmitted through routers of the NOC to another IP block. Such network-addressed communications (146) are bi-directional, potentially proceeding to and from each IP block of the NOC, depending on their use in any particular application. Each network interface controller, however, is enabled to both send and receive (142) such communications to and from an associated router, and each network interface controller is enabled to both send and receive (146) such communications directly to and from an associated IP block, bypassing an associated memory communications controller (106).

Each network interface controller (108) in the example of FIG. 3 is also enabled to implement virtual channels on the network, characterizing network packets by type. Each network interface controller (108) includes virtual channel implementation logic (138) that classifies each communication instruction by type and records the type of instruction in a field of the network packet format before handing off the instruction in packet form to a router (110) for transmission on the NOC. Examples of communication instruction types include inter-IP block network-address-based messages, request messages, responses to request messages, invalidate messages directed to caches; memory load and store messages; and responses to memory load messages, and so on.

Each router (110) in the example of FIG. 3 includes routing logic (130), virtual channel control logic ('VCCL') (132), and virtual channel buffers (134). The routing logic typically is implemented as a network of synchronous and asynchronous logic that implements a data communications protocol stack for data communication in the network formed by the routers (110), links (120), and bus wires among the routers. The routing logic (130) includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed. Each router in this example includes five ports, four ports (121) connected through bus wires (120-A, 120-B, 120-C, 120-D) to other routers and a fifth port (123) connecting each router to its associated IP block (104) through a network interface controller (108) and a memory communications controller (106).

In describing memory-address-based communications above, each memory address was described as mapped by network interface controllers to a network address, a network location of a memory communications controller. The network location of a memory communication controller (106) is naturally also the network location of that memory communication controller's associated router (110), network interface controller (108), and IP block (104). In inter-IP block, or network-address-based communications, therefore, it is also typical for application-level data processing to view network addresses as location of IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x,y coordinates of each such set in the mesh.

In the NOC (102) of FIG. 3, each router (110) implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router (110) in the example of FIG. 3 also includes virtual channel control logic (132) and virtual channel buffers (134). The virtual channel control logic (132) examines each received packet for its assigned communications type and places each packet in an outgoing virtual channel buffer for that communications type for transmission through a port to a neighboring router on the NOC.

Each virtual channel buffer (134) has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer (134) in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller (108). Each network interface controller is configured to, upon receipt of such a signal, refuse to accept, from its associated memory communications controller (106) or from its associated IP block (104), communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped in the architecture of FIG. 3. When a router encounters a situation in which a packet might be dropped in some unreliable protocol such as, for example, the Internet Protocol, the routers in the example of FIG. 3 suspend by their virtual channel buffers (134) and their virtual channel control logic (132) all transmissions of packets in a virtual channel until buffer space is again available, eliminating any need to drop packets. The NOC of FIG. 3, therefore, implements highly reliable network communications protocols with an extremely thin layer of hardware.

Figure 4:
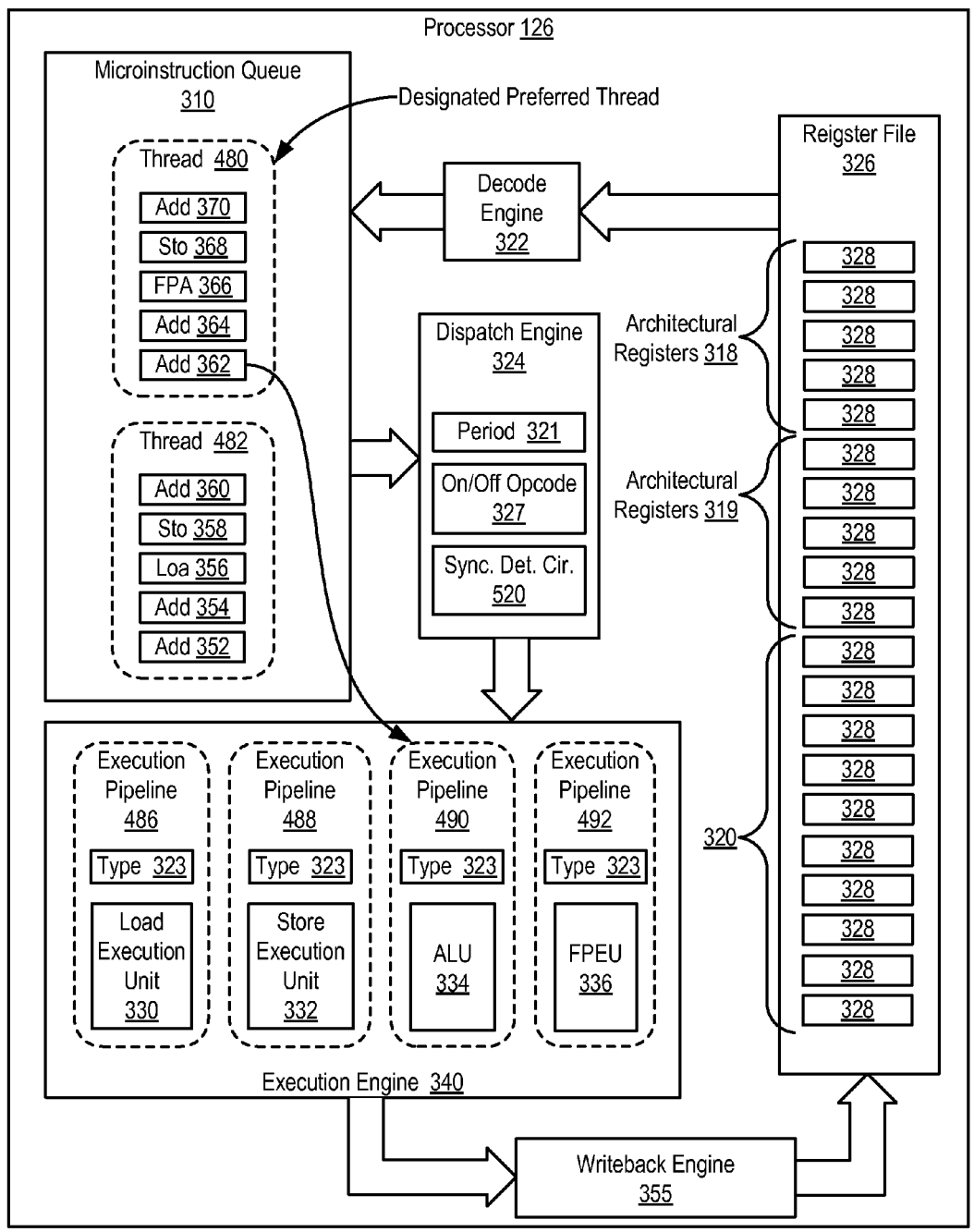
FIG. 4 sets forth a functional block diagram of an example of a computer processor according to embodiments of the present invention.

For further explanation, FIG. 4 sets forth a functional block diagram of an example of a computer processor (126) that dispatches instructions preferentially according to embodiments of the present invention. Such a processor may be implemented as part of a generally programmable computer, as a microprocessor, as a microcontroller in an embedded system, as an IP block on a NOC, and in other ways as will occur to those of skill in the art. The processor (126) includes a decode engine (322), a dispatch engine (324), an execution engine (340), and a writeback engine (355). Each of these engines is a network of static and dynamic logic within the processor (126) that carries out particular functions for processing program instructions internally within the processor. The dispatch engine (324) is an example of an instruction dispatcher that dispatches instructions preferentially within the meaning of the present invention.

The processor's decode engine (322) reads a user-level computer program instruction from an architectural register and decodes that instruction into one or more microinstructions for insertion into a microinstruction queue (310). Just as a single high level language instruction is compiled and assembled to a series of machine instructions (load, store, shift, etc), each machine instruction is in turn implemented by a series of microinstructions. Such a series of microinstructions is sometimes called a 'microprogram' or 'microcode.' The microinstructions are sometimes referred to as 'micro-operations,' 'micro-ops,' or 'μops'—although in this specification, a microinstruction is generally referred to as a 'microinstruction,' a 'computer instruction,' or simply as an 'instruction.'

Microprograms are carefully designed and optimized for the fastest possible execution, since a slow microprogram would yield a slow machine instruction which would in turn cause all programs using that instruction to be slow. Microinstructions, for example, may specify such fundamental operations as the following:

Connect Register 1 to the "A" side of the ALU
Connect Register 7 to the "B" side of the ALU
Set the ALU to perform two's-complement addition
Set the ALU's carry input to zero
Store the result value in Register 8
Update the "condition codes" with the ALU status flags ("Negative", "Zero", "Overflow", and "Carry")
Microjump to MicroPC nnn for the next microinstruction For a further example: A typical assembly language instruction to add two numbers, such as, for example, ADD A, B, C, may add the values found in memory locations A and B and then put the result in memory location C. In processor (126), the decode engine (322) may break this user-level instruction into a series of microinstructions similar to:

LOAD A, Reg1
LOAD B, Reg2
ADD Reg1, Reg2, Reg3
STORE Reg3, C

It is these microinstructions that are then placed in the microinstruction queue (310) to be dispatched to execution pipelines and execution units.

The execution engine (340) includes several execution pipelines (486-492) and execution units (330-336), one LOAD memory instruction execution unit (330), one STORE memory instruction execution unit (332), one arithmetic-logic unit ('ALU') (334), and one floating point execution unit ('FPEU') (336). Each execution pipeline is made up of a configuration of one or more execution units (330-336). Each execution pipeline (486-492) provides control circuitry for an execution unit as well as interfaces for communications between an execution unit and other components of the processor. In this particular example, for ease of explanation, each execution pipeline is configured with only one execution unit, but that is not a limitation of the present invention. In processors that dispatch instructions preferentially according to embodiments of the present invention, each execution pipeline may be configured with any number of execution units as may occur to those of skill in the art.

Each execution pipeline (486-492) is characterized by an execution pipeline type (323), where each execution pipeline type is determined according to the types of computer program instructions executed in each execution pipeline. Instructions may be typed, for example, according to the instructions' operation codes or 'opcodes,' ADD, STORE, LOAD, and so on. Instructions may be typed according to the execution unit upon which the instruction executes, so that Boolean and integer arithmetic operations would be of a type because they all execute on an ALU. In such a typing, all floating point operations would be of a type because they all execute on a floating point execution unit. And so on.

The processor (126) in the example of FIG. 4 includes a plurality of hardware threads of execution (480, 482), where each hardware thread includes computer program instructions characterized by instruction types. The threads are hardware threads in that the support for the threads is built into the processor itself in the form of a separate architectural register set (318, 319) for each thread (480, 482), so that each thread can execute simultaneously with no need for context switches among the threads. Each such hardware thread can run multiple software threads of execution implemented with the software threads assigned to portions of processing time called 'quanta' or 'time slots' and context switches that save the contents of a set of architectural registers for a software thread during periods when that software thread loses possession of its assigned hardware thread. Each hardware thread (480, 482) in the example of FIG. 4 includes sequences of instructions of a same instruction type, the sequences interspersed with instructions of other types as described above with reference to Table 1.

The processor (126) in this example includes a register file (326) made up of all the registers (328) of the processor. The register file (326) is an array of processor registers implemented, for example, with fast static memory devices. The registers include registers (320) that are accessible only by the execution units as well as two sets of 'architectural registers' (318, 319), one set for each hardware thread (480, 482). The instruction set architecture of processor (126) defines a set of registers, called 'architectural registers,' that are used to stage data between memory and the execution units in the processor. The architectural registers are the registers that are accessible directly by user-level computer program instructions.

The processor (126) in the example of FIG. 4 includes an instruction dispatcher (324), a network of static and dynamic logic within the processor (126) that dispatches, for purposes of pipelining program instructions internally within the processor, instructions from hardware threads to execution pipelines (486-492) and hence to execution units (330-336). The instruction dispatcher (324) in this example dispatches instructions preferentially during a predefined preference period (321) from a preferred hardware thread (480) to a particular execution pipeline (490) in dependence upon whether the preferred hardware thread presents a sequence of instructions, ready for execution from the preferred hardware thread, of a type for execution in the particular execution pipeline. In this example, ADD instructions (362, 364) are ready for dispatch from a preferred thread (480), so the dispatch is from thread (480) to execution pipeline (490) and execution unit (334), an ALU, because ADD instructions are of a type for execution by an ALU. The predefined preference period (321) may be so long as the preferred thread continues to present a sequence of instructions of a type for execution in a particular execution pipeline, although there are other ways of predefining preference periods within the scope of the present invention, including, for example, predefining the preference period as a predetermined number of instructions of the same type and predefining the preference period as a predetermined number of clock cycles.

The processor (126) in this example provides an ability to turn dispatching instructions preferentially on and off in software by an opcode (327) specifically dedicated to turning preferential dispatching on and off under software control. Such an opcode can be supported in assemblers and also through compilers in higher level languages to give programmers express control of preferential dispatching.

In addition to supporting an opcode (327) that gives programmers, assemblers, and compilers the ability to turn preferential dispatching on and off in software, the processor (126) in the example of FIG. 4 also includes synchronization detection circuitry (520) that examines instructions in the threads of execution (480, 482) and detects synchronization in instructions of a same type among two or more hardware threads, giving the processor the ability itself to turn preferential dispatching on and off without regard to software controls. In the example of FIG. 4, when the synchronization circuitry (520) detects the presence of synchronization among program instructions in two or more threads of execution, the instruction dispatcher (324) can turn on preferential dispatching by designating as the preferred hardware thread a hardware thread in which such synchronization is detected and dispatching instructions preferentially from such a designated preferred hardware thread. When the synchronization circuitry (520) reports that the synchronization has been cleared, the instruction dispatcher (324) can turn off preferential dispatching under its own hardware control. In addition in the example processor (126) of FIG. 4, the instruction dispatcher (324) is further capable of rotating among the hardware threads of execution (480, 482) the designation of the preferred hardware thread from which instructions are to be preferentially dispatched.

Figure 5:
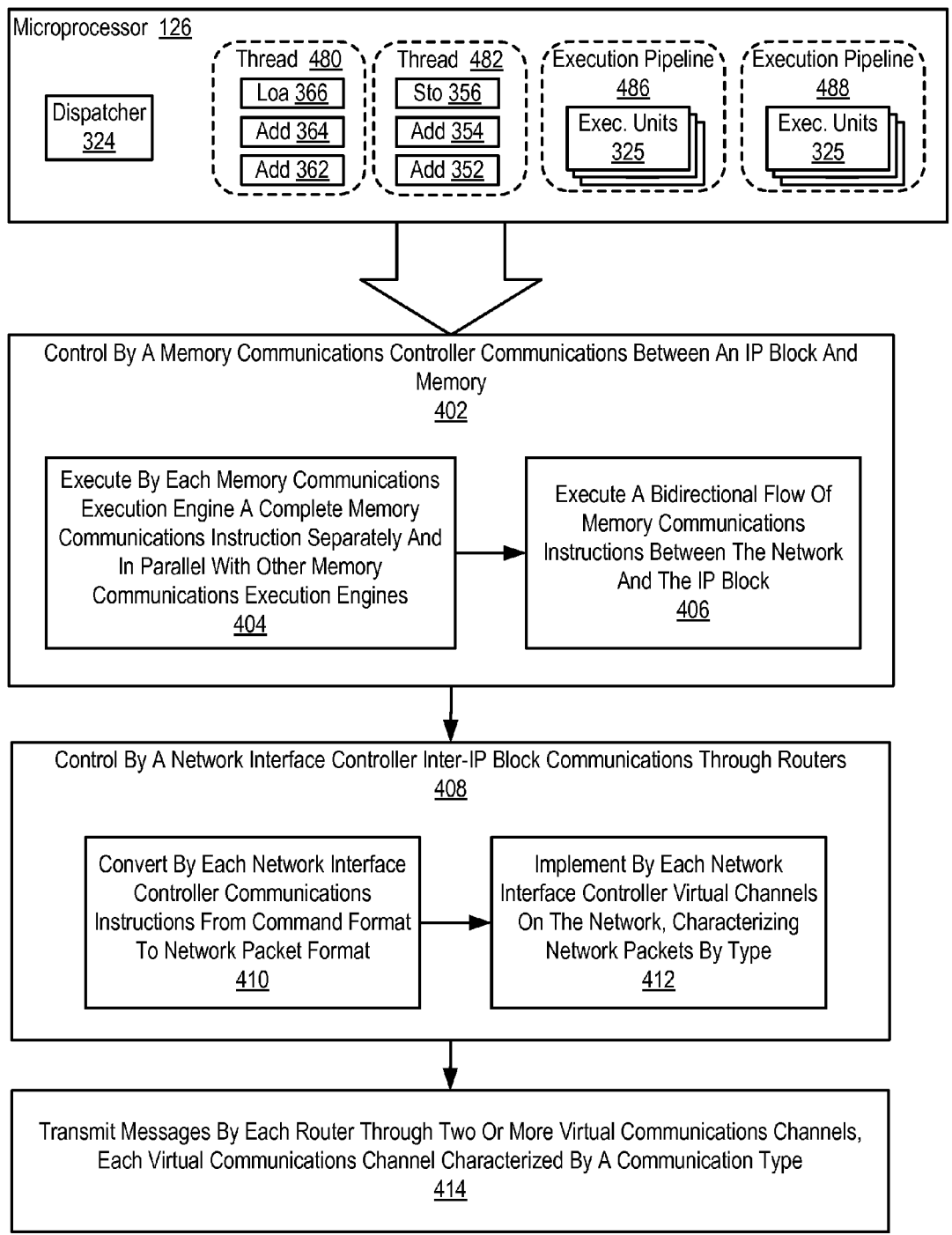
FIG. 5 sets forth a flow chart illustrating an example of a method of operation of a NOC that implements in its IP blocks computer processors according to embodiments of the present invention.

For further explanation, FIG. 5 sets forth a flow chart illustrating an example of a method of operation of a NOC that implements in its IP blocks computer processors according to embodiments of the present invention. The method of FIG. 5 is implemented on a NOC similar to the ones described above in this specification, a NOC (102 on FIG. 2) that is implemented on a chip (100 on FIG. 3) with IP blocks (104 on FIG. 2), routers (110 on FIG. 2), memory communications controllers (106 on FIG. 2), and network interface controllers (108 on FIG. 2). Each IP block (104 on FIG. 2) is adapted to a router (110 on FIG. 2) through a memory communications controller (106 on FIG. 2) and a network interface controller (108 on FIG. 2). A NOC that operates according to the method of FIG. 5 implements in one or more of its IP blocks a general purpose microprocessor (126) that dispatches instructions preferentially according to embodiments of the present invention. Each such microprocessor (126) implements a plurality of execution pipelines (486, 488), where each execution pipeline includes a configuration of one or more execution units (325) of the processor. Each execution pipeline is characterized by an execution pipeline type, and each execution pipeline type is determined according to the types of computer program instructions executed in each execution pipeline. Each such microprocessor (126) also implements a plurality of hardware threads of execution (480, 482). Each hardware thread includes computer program instructions (352, 354, 356, 362, 364, 366) characterized by instruction types, and each hardware thread includes sequences of instructions of a same instruction type (352, 354, 362, 364) with the sequences interspersed with instructions of other types (356, 366). Each such microprocessor (126) includes an instruction dispatcher (324) that dispatches instructions preferentially during a predefined preference period from a preferred hardware thread to a particular execution pipeline in dependence upon whether the preferred hardware thread presents a sequence of instructions, ready for execution from the preferred hardware thread, of a type for execution in the particular execution pipeline.

The method of FIG. 5 includes controlling (402) by a memory communications controller (106 on FIG. 3) communications between an IP block and memory. In the method of FIG. 5, the memory communications controller includes a plurality of memory communications execution engines (140 on FIG. 3). Also in the method of FIG. 5, controlling (402) communications between an IP block and memory is carried out by executing (404) by each memory communications execution engine a complete memory communications instruction separately and in parallel with other memory communications execution engines and executing (406) a bidirectional flow of memory communications instructions between the network and the IP block. In the method of FIG. 5, memory communications instructions may include translation lookaside buffer control instructions, cache control instructions, barrier instructions, memory load instructions, and memory store instructions. In the method of FIG. 5, memory may include off-chip main RAM, memory connected directly to an IP block through a memory communications controller, on-chip memory enabled as an IP block, and on-chip caches.

The method of FIG. 5 also includes controlling (408) by a network interface controller (108 on FIG. 3) inter-IP block communications through routers. In the method of FIG. 5, controlling (408) inter-IP block communications also includes converting (410) by each network interface controller communications instructions from command format to network packet format and implementing (412) by each network interface controller virtual channels on the network, including characterizing network packets by type.

The method of FIG. 5 also includes transmitting (414) messages by each router (110 on FIG. 3) through two or more virtual communications channels, where each virtual communications channel is characterized by a communication type. Communication instruction types, and therefore virtual channel types, include, for example: inter-IP block network-address-based messages, request messages, responses to request messages, invalidate messages directed to caches; memory load and store messages; and responses to memory load messages, and so on. In support of virtual channels, each router also includes virtual channel control logic (132 on FIG. 3) and virtual channel buffers (134 on FIG. 3). The virtual channel control logic examines each received packet for its assigned communications type and places each packet in an outgoing virtual channel buffer for that communications type for transmission through a port to a neighboring router on the NOC.

Figure 6:
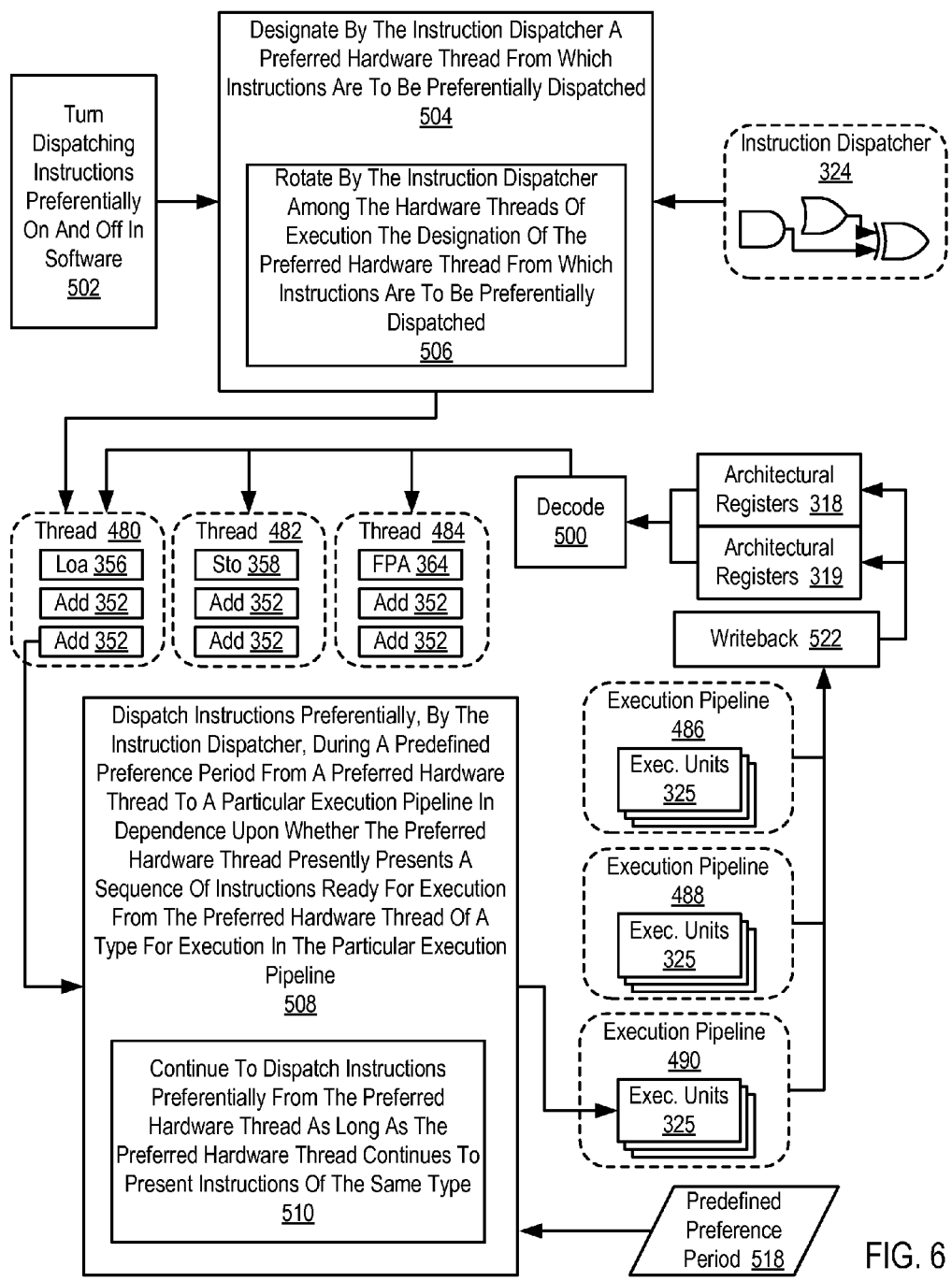
FIG. 6 sets forth a flow chart illustrating an example of a method of operation of a computer processor according to embodiments of the present invention.

For further explanation, FIG. 6 sets forth a flow chart illustrating an example of a method of operation of a computer processor according to embodiments of the present invention. The method of FIG. 6 may be implemented on a computer processor having any form factor, a generally programmable computer, a microcontroller in an embedded system, a general-purpose microprocessor, a microprocessor in an IP block on a NOC, and in other forms as may occur to those of skill in the art.

A computer processor that supports the method of FIG. 6 includes an instruction dispatcher (324) such as the instruction dispatcher described above with regard to reference (324) on FIGS. 1, 3, and 4. A computer processor that supports the method of FIG. 6 also includes a plurality of execution pipelines (486, 488, 490), where each execution pipeline is made up of a configuration of one or more execution units (325) of the processor. Each execution pipeline is characterized by an execution pipeline type (323 on FIGS. 1 and 4), where each execution pipeline type is determined according to the types of computer program instructions executed in each execution pipeline. A computer processor that supports the method of FIG. 6 also includes a plurality of hardware threads of execution (480, 482, 484), where each hardware thread has executing within it computer program instructions (352, 356, 358, 364) characterized by instruction types. In addition, each hardware thread includes sequences of instructions of a same instruction type (352), with the sequences interspersed with instructions of other types (356, 358, 364).

The method of FIG. 6 includes turning (502) dispatching instructions preferentially on and off in software. The method of FIG. 6 also includes designating (504) by the instruction dispatcher a preferred hardware thread (480) from which instructions are to be preferentially dispatched. In the method of FIG. 6, designating (504) a preferred hardware thread includes rotating (506) by the instruction dispatcher among the hardware threads of execution the designation of the preferred hardware thread from which instructions are to be preferentially dispatched.

The method of FIG. 6 also includes dispatching (508) instructions preferentially, by the instruction dispatcher, during a predefined preference period (518) from a preferred hardware thread (480) to a particular execution pipeline (490) in dependence upon whether the preferred hardware thread presently presents a sequence of instructions ready for execution from the preferred hardware thread of a type for execution in the particular execution pipeline. In this example, the ADD instructions (352) are taken as an example of a sequence of instructions ready for execution from the preferred hardware thread (480) of a type for execution in the particular execution pipeline (490) which taken as having among its execution units (325) at least one ALU. In the method of FIG. 6, dispatching (508) instructions preferentially includes continuing (510) to dispatch instructions preferentially from the preferred hardware thread as long as the preferred hardware thread continues to present instructions of the same type.

Figure 7:
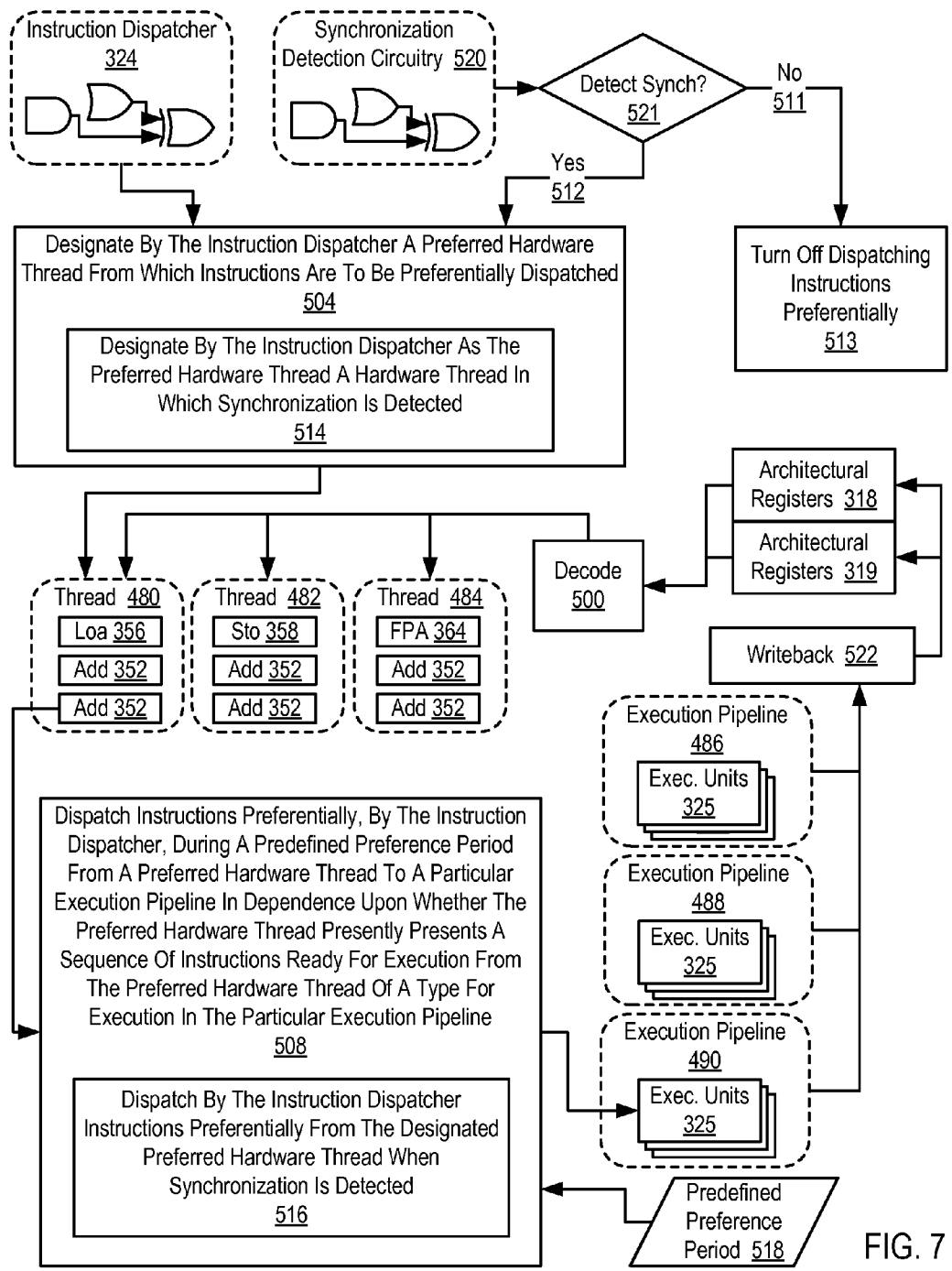
FIG. 7 sets forth a flow chart illustrating a further example of a method of operation of a computer processor according to embodiments of the present invention.

For further explanation, FIG. 7 sets forth a flow chart illustrating a further example of a method of operation of a computer processor according to embodiments of the present invention. The method of FIG. 7 is similar to the method of FIG. 6. The method of FIG. 7 is implemented on a computer processor similar to the one upon which the method of FIG. 6 is implemented, the processor having an instruction dispatcher (324) similar to those described above with regard to reference (324) on FIGS. 1, 3, and 4, a processor having a plurality of execution pipelines (486, 488, 490), each execution pipeline made up of a configuration of one or more execution units (325), each execution pipeline characterized by an execution pipeline type, each execution pipeline type determined according to the types of computer program instructions executed in each execution pipeline, and so on. The method of FIG. 7, like the method of FIG. 6, includes the steps of designating (504) by the instruction dispatcher a preferred hardware thread (480) from which instructions are to be preferentially dispatched and dispatching (508) instructions preferentially from a preferred hardware thread (480) to a particular execution pipeline (490), although, as explained below, these steps function somewhat differently in the method of FIG. 7. Unlike the method of FIG. 6, however, the method of FIG. 7 is not turned on with software (502 on FIG. 6). Instead, the method of FIG. 7 illustrates an alternative way of starting the process of dispatching instructions preferentially according to embodiments of the present invention. A computer processor that supports the method of FIG. 7 includes synchronization detection circuitry (520), conductors, synchronous and asynchronous logic, so adapted to the hardware threads of execution (480, 482, 484) as to be capable of detecting synchronization of instructions of a same type among two or more hardware threads. The method of FIG. 7 then includes detecting (512) by the synchronization detection circuitry synchronization of sequences of instructions of a same type among two or more hardware threads. In this example, where all three threads (480, 481, 484) contain sequences of instructions of the same kind ready for dispatch, that is, the ADD instructions (352), the synchronization detection circuitry would detect synchronization among all three threads. As illustrated, the method of FIG. 7 includes a determination (521) whether the synchronization detection circuitry detects synchronization of sequences of instructions of a same type among two or more hardware threads. If such synchronization is detected (512), the dispatching of instruction preferentially is turned on by designating (504) a preferred hardware thread, which is carried out by designating (514) by the instruction dispatcher as the preferred hardware thread a hardware thread in which synchronization is detected. In this example, thread (480) is taken as the designated preferred hardware thread. In the method of FIG. 7, dispatching (508) instructions preferentially is carried out by dispatching (516) by the instruction dispatcher instructions preferentially from the designated preferred hardware thread (480) when synchronization is detected (512). If synchronization is not detected (511), the dispatching of instructions preferentially is turned off (513), in hardware, by the instruction dispatcher (324).

Figure 8:
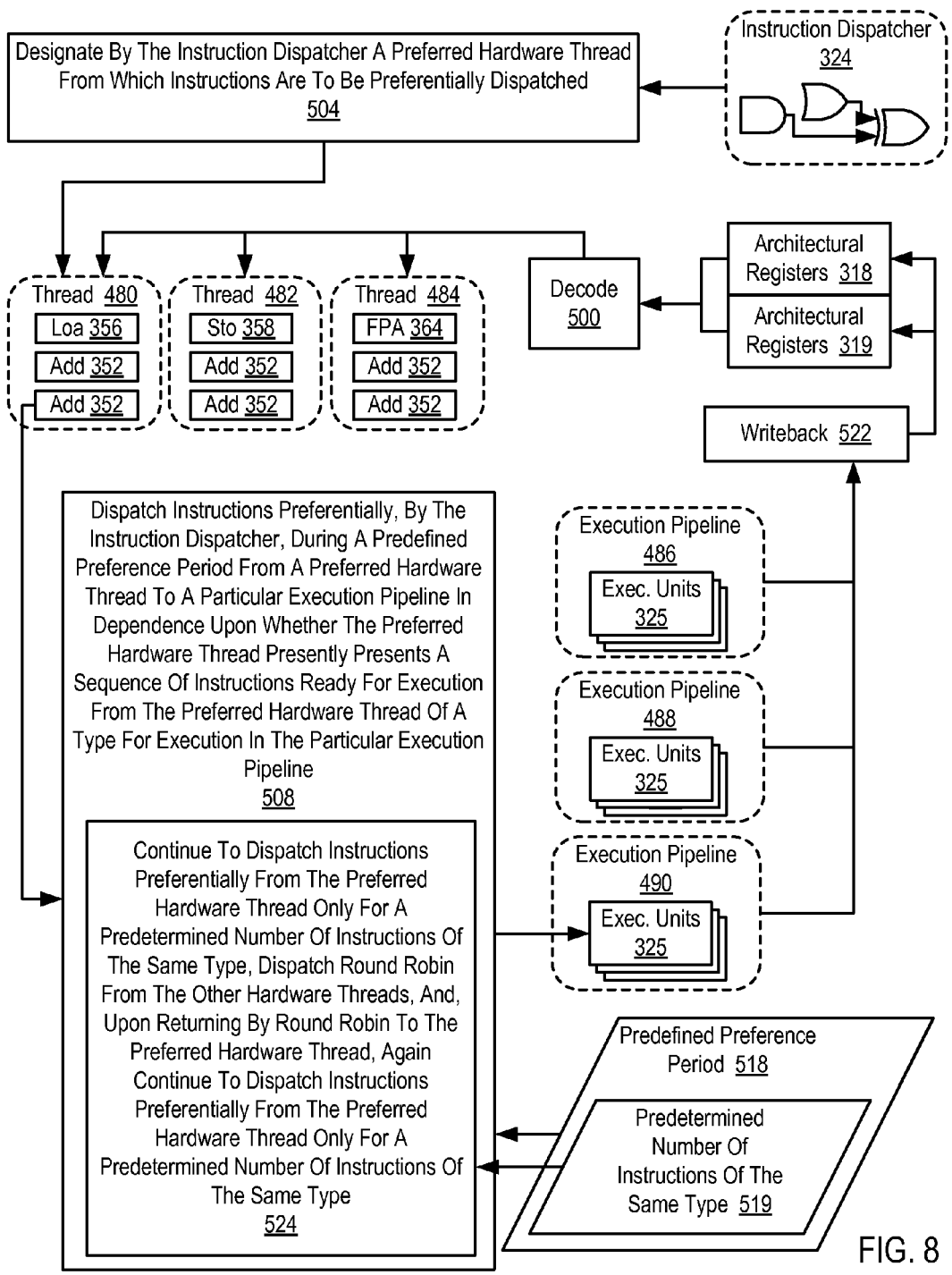
FIG. 8 sets forth a flow chart illustrating a further of a method of operation of a computer processor according to embodiments of the present invention.

For further explanation, FIG. 8 sets forth a flow chart illustrating a further example of a method of operation of a computer processor according to embodiments of the present invention. The method of FIG. 8 is similar to the method of FIG. 6. The method of FIG. 8 is implemented on a computer processor similar to the one upon which the method of FIG. 6 is implemented, the processor having an instruction dispatcher (324) similar to those described above with regard to reference (324) on FIGS. 1, 3, and 4, a processor having a plurality of execution pipelines (486, 488, 490), each execution pipeline made up of a configuration of one or more execution units (325), each execution pipeline characterized by an execution pipeline type, each execution pipeline type determined according to the types of computer program instructions executed in each execution pipeline, and so on. The method of FIG. 8, like the method of FIG. 6, includes the steps of designating (504) by the instruction dispatcher a preferred hardware thread (480) from which instructions are to be preferentially dispatched and dispatching (508) instructions preferentially from a preferred hardware thread to a particular execution pipeline.

In the example of FIG. 8, however, dispatching (508) instructions preferentially is implemented somewhat differently than in the method of FIG. 6. Unlike the method of FIG. 6, in the method of FIG. 8, dispatching (508) instructions preferentially is carried out by continuing (524) to dispatch instructions preferentially from the preferred hardware thread (480) only for a predetermined number (519) of instructions of the same type, dispatching round robin from the other hardware threads (482, 484), and, upon returning by round robin to the preferred hardware thread (480), again continuing to dispatch instructions preferentially from the preferred hardware thread only for a predetermined number of instructions of the same type (519). In this example, 'instructions of the same type' means instructions of a type for dispatch to a particular execution pipeline. Also in this example, the predetermined number (519) of instructions of the same type to be executed from the preferred thread implements the predefined preference period (518), which is then expressed in terms of an instruction count rather than in terms of a time as such or a number of processor clock cycles.

To the extent that there are fewer instructions of the same type in a sequence than the predetermined number to be executed from the preferred thread, the instruction dispatcher (324) round robins to a next thread upon encountering an instruction of a different type, so that the predetermined number (519) operates in effect as a maximum. In an example where thread (480) is the preferred thread, the sequence of instructions of the same type is a sequence of two ADD instructions (352), and the predetermined number of instructions to execute is 10, the instruction dispatcher can round robin on to dispatch instructions from thread (482) upon encountering the LOAD instruction (356) in thread (480), thereby executing only two instructions of the same type despite the fact that the predetermined number of instructions of the same type was 10.

If thread (480) presented a sequence of 20 ADD instructions, then the instruction dispatcher would dispatch only 10 of them before moving on round robin to dispatch from one of the other threads (482, 484), thereby treating the predetermined number (519) as a maximum number of instructions of a same kind to be dispatched preferentially from a preferred thread before moving round robin to dispatch instructions from some other thread. In this way, dispatch from the preferred thread is merely preferred or weighted in favor of the preferred thread without assigning to the preferred thread an absolute priority. In this way, synchronization risk is reduced without starving other threads from access to execution resources.

Figure 9:
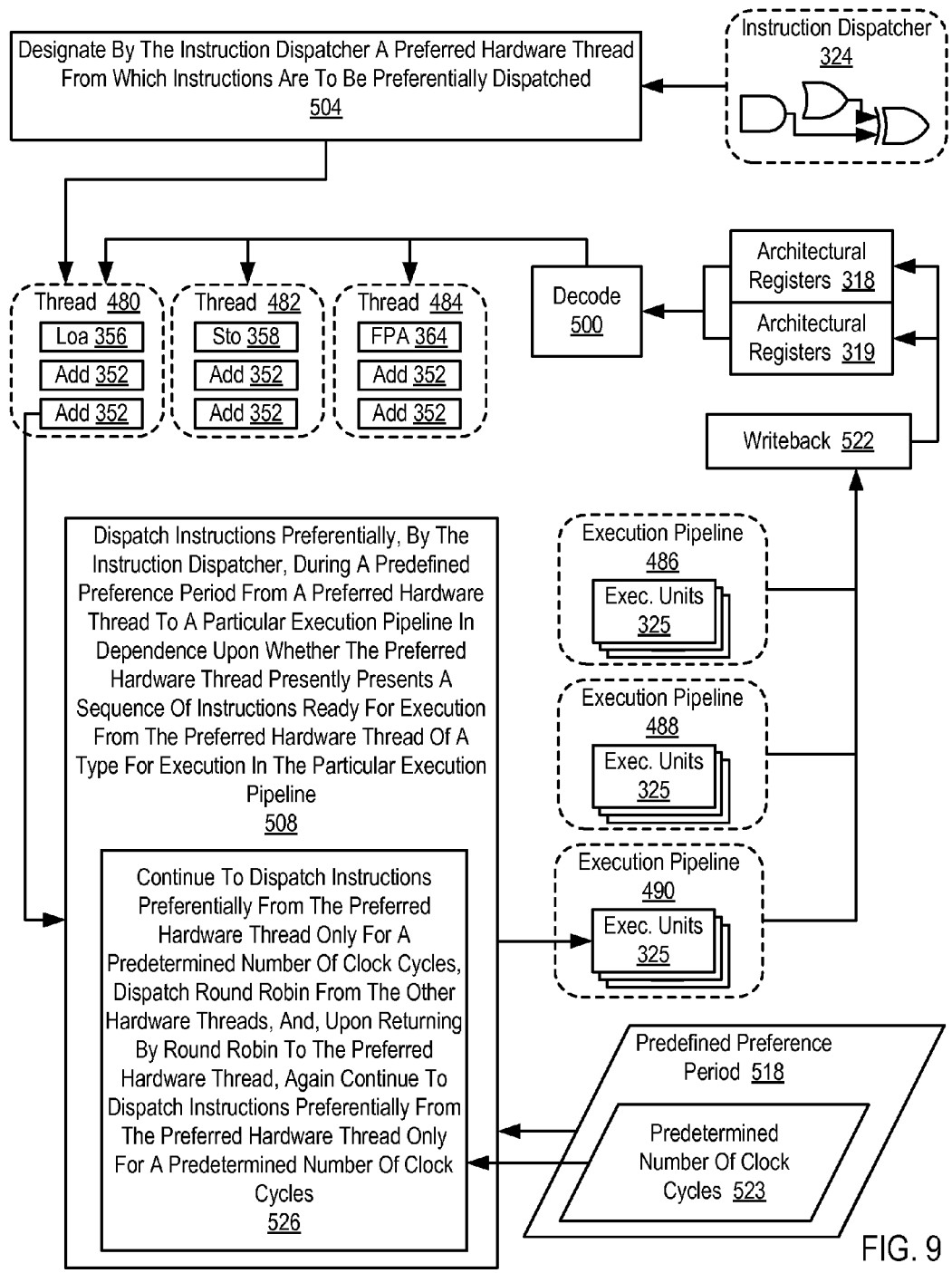
FIG. 9 sets forth a flow chart illustrating a further of a method of operation of a computer processor according to embodiments of the present invention.

For further explanation, FIG. 9 sets forth a flow chart illustrating a further example of a method of operation of a computer processor according to embodiments of the present invention. The method of FIG. 9 is similar to the method of FIG. 6. The method of FIG. 9 implemented on a computer processor similar to the one upon which the method of FIG. 6 is implemented, the processor having an instruction dispatcher (324) similar to those described above with regard to reference (324) on FIGS. 1, 3, and 4, a processor having a plurality of execution pipelines (486, 488, 490), each execution pipeline made up of a configuration of one or more execution units (325), each execution pipeline characterized by an execution pipeline type, each execution pipeline type determined according to the types of computer program instructions executed in each execution pipeline, and so on. The method of FIG. 9, like the method of FIG. 6, includes the steps of designating (504) by the instruction dispatcher a preferred hardware thread (480) from which instructions are to be preferentially dispatched and dispatching (508) instructions preferentially from a preferred hardware thread to a particular execution pipeline.

In the example of FIG. 9, however, dispatching (508) instructions preferentially is implemented somewhat differently than in the method of FIG. 6. Unlike the method of FIG. 6, in the method of FIG. 9, dispatching (508) instructions preferentially is carried out by continuing (524) to dispatch instructions preferentially from the preferred hardware thread only for a predetermined number of clock cycles (523), dispatching round robin from the other hardware threads (482, 484), and, upon returning by round robin to the preferred hardware thread (480), again continuing to dispatch instructions preferentially from the preferred hardware thread only for a predetermined number of clock cycles (480).

To the extent that there are fewer instructions of the same type in a sequence to be executed from the preferred thread than will be executed during predetermined number of clock cycles, one or more instructions of another type are executed during the predetermined number of clock cycles. Only after the predetermined number of clock cycles does the instruction dispatcher (324) round robin to a next thread, so that the predetermined number (523) represents in effect a minimum number of instructions to execute even if the minimum includes instructions of a type other than the instructions of the same type in sequence. In an example where thread (480) is the preferred thread, the predetermined number of clock cycles is 10, the sequence of instructions of the same type is a sequence of two ADD instructions (352), the instruction dispatcher can round robin on to dispatch instructions from thread (482) only after dispatching from thread (480) for 10 clock cycles, which in this example would dispatch the two ADD instruction plus at least one LOAD instruction (336) as well as seven other instructions—optionally including additional ADD instructions as well as instructions of other types. If thread (480) presented a sequence of 20 ADD instructions, then the instruction dispatcher would dispatch only 10 of them before moving on round robin to dispatch from one of the other threads (482, 484), again showing that dispatching from a preferred thread according to embodiments of the present invention is merely a preference or a weighting in favor of the preferred thread with no assignment to the preferred thread of an absolute priority. In this way, synchronization risk is reduced without starving other threads from access to execution resources.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer processor comprising:
a plurality of execution pipelines, each execution pipeline comprising a configuration of one or more execution units of the processor, each execution pipeline characterized by an execution pipeline type, each execution pipeline type determined according to the types of computer program instructions executed in each execution pipeline;
a plurality of hardware threads of execution, each hardware thread comprising computer program instructions characterized by instruction types, each hardware thread comprising sequences of instructions of a same instruction type, the sequences interspersed with instructions of other types, wherein each hardware thread includes a register for storing instructions;
synchronization detection circuitry capable of detecting synchronization of sequences of instructions of a same type among two or more hardware threads, wherein synchronization occurs when two or more threads present sequences of a same instruction type at the same time; and
an instruction dispatcher capable of:
dispatching instructions preferentially during a predefined preference period from a preferred hardware thread to a particular execution pipeline in dependence upon whether the preferred hardware thread presents a sequence of instructions, ready for execution from the preferred hardware thread, of a type for execution in the particular execution pipeline;
designating as the preferred hardware thread a hardware thread in which such synchronization is detected; and
dispatching instructions preferentially from such a designated preferred hardware thread when such synchronization is detected.

2. The processor of claim 1 wherein dispatching instructions preferentially can be turned on and off in software.

3. The processor of claim 1 wherein the instruction dispatcher is further capable of rotating among the hardware threads of execution the designation of the preferred hardware thread from which instructions are to be preferentially dispatched.

4. The processor of claim 1 wherein the instruction dispatcher continues dispatching instructions preferentially from the preferred hardware thread as long as the preferred hardware thread continues to present instructions of the same type.

5. The processor of claim 1 wherein the instruction dispatcher continues dispatching instructions preferentially from the preferred hardware thread only for a predetermined number of instructions of the same type, dispatches round robin from the other hardware threads, and, upon returning by round robin to the preferred hardware thread, again continues dispatching instructions preferentially from the preferred hardware thread only for a predetermined number of instructions of the same type.

6. The processor of claim 1 wherein the instruction dispatcher continues dispatching instructions preferentially from the preferred hardware thread only for a predetermined number of clock cycles, dispatches round robin from the other hardware threads, and, upon returning by round robin to the preferred hardware thread, again continues dispatching instructions preferentially from the preferred hardware thread only for a predetermined number of clock cycles.

7. The processor of claim 1 wherein the processor is implemented as a component of an IP block in a network on chip ('NOC'), the NOC comprising IP blocks, routers, memory communications controllers, and network interface controller, each IP block adapted to a router through a memory communications controller and a network interface controller, each memory communications controller controlling communication between an IP block and memory coupled to the IP block, each network interface controller controlling inter-IP block communications through routers.

8. The processor of claim 7 wherein each IP block comprises a reusable unit of synchronous or asynchronous logic design used as a building block for data processing within the NOC.

9. The processor of claim 7 wherein each router comprises two or more virtual communications channels, each virtual communications channel characterized by a communication type.

10. A method of operation for a computer processor, the processor comprising:
- an instruction dispatcher,
- a plurality of execution pipelines, each execution pipeline comprising a configuration of one or more execution units of the processor, each execution pipeline characterized by an execution pipeline type, each execution pipeline type determined according to the types of computer program instructions executed in each execution pipeline;
- a plurality of hardware threads of execution, each hardware thread comprising computer program instructions characterized by instruction types, each hardware thread comprising sequences of instructions of a same instruction type, the sequences interspersed with instructions of other types, wherein each hardware thread includes a register for storing instructions; and
- synchronization detection circuitry;

the method comprising:
- detecting by the synchronization detection circuitry synchronization of sequences of instructions of a same type among two or more hardware threads;
- designating by the instruction dispatcher a preferred hardware thread from which instructions are to be preferentially dispatched further comprising designating as the preferred hardware thread a hardware thread in which synchronization is detected; and
- dispatching instructions preferentially, by the instruction dispatcher, during a predefined preference period from a preferred hardware thread to a particular execution pipeline in dependence upon whether the preferred hardware thread presently presents a sequence of instructions ready for execution from the preferred hardware thread of a type for execution in the particular execution pipeline further comprising dispatching instructions preferentially from the designated preferred hardware thread when synchronization is detected.

11. The method of claim 10 further comprising turning dispatching instructions preferentially on and off in software.

12. The method of claim 10 wherein designating a preferred hardware thread further comprises rotating by the instruction dispatcher among the hardware threads of execution the designation of the preferred hardware thread from which instructions are to be preferentially dispatched.

13. The method of claim 10 wherein dispatching instructions preferentially further comprises continuing to dispatch instructions preferentially from the preferred hardware thread as long as the preferred hardware thread continues to present instructions of the same type.

14. The method of claim 10 wherein dispatching instructions preferentially further comprises continuing to dispatch instructions preferentially from the preferred hardware thread only for a predetermined number of instructions of the same type, dispatching round robin from the other hardware threads, and, upon returning by round robin to the preferred hardware thread, again continuing to dispatch instructions preferentially from the preferred hardware thread only for a predetermined number of instructions of the same type.

15. The method of claim 10 wherein dispatching instructions preferentially further comprises continuing to dispatch instructions preferentially from the preferred hardware thread only for a predetermined number of clock cycles, dispatching round robin from the other hardware threads, and, upon returning by round robin to the preferred hardware thread, again continuing to dispatch instructions preferentially from the preferred hardware thread only for a predetermined number of clock cycles.

16. The method of claim 10 wherein the processor is implemented as a component of an IP block in a network on chip ('NOC'), the NOC comprising IP blocks, routers, memory communications controllers, and network interface controller, each IP block adapted to a router through a memory communications controller and a network interface controller, each memory communications controller controlling communication between an IP block and memory coupled to the IP block, each network interface controller controlling inter-IP block communications through routers.

17. The method of claim 16 wherein each IP block comprises a reusable unit of synchronous or asynchronous logic design used as a building block for data processing within the NOC.

18. The method of claim 16 wherein each router comprises two or more virtual communications channels, each virtual communications channel characterized by a communication type.

* * * * *